Dec. 16, 1924.

R. I. CLAPP

NUT LOCK

Filed Aug. 15, 1923

1,519,361

Roger I. Clapp, INVENTOR

BY Victor J. Evans

ATTORNEY

WITNESS:

Patented Dec. 16, 1924.

1,519,361

UNITED STATES PATENT OFFICE.

ROGER I. CLAPP, OF SHANGHAI, CHINA.

NUT LOCK.

Application filed August 15, 1923. Serial No. 657,617.

*To all whom it may concern:*

Be it known that I, ROGER I. CLAPP, a citizen of the United States, residing at Shanghai, China, have invented new and useful Improvements in Nut Locks, of which the following is a specification.

This invention relates to a nut lock, the general object of the invention being to provide a rotary member which is arranged in the nut and having means whereby it will be rotated with the bolt with means for preventing the member from being rotated but in one direction.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
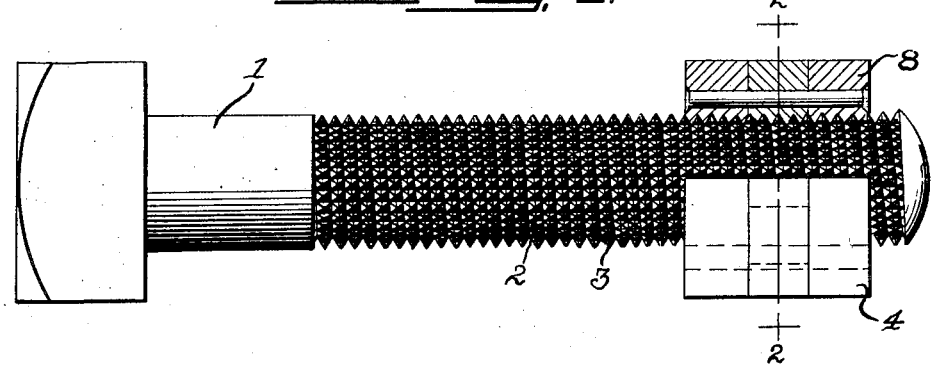
Figure 1 is a fragmentary view of a bolt and nut showing my invention in use.
Figure 2:
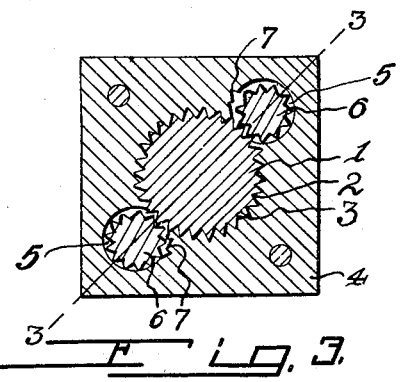
Figure 2 is a section on line 2—2 of Figure 1.
Figure 3:
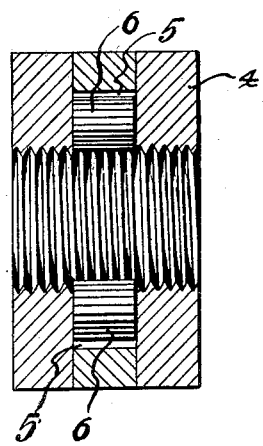
Figure 3 is a sectional view through the nut.

In these views 1 indicates the bolt which is provided with the longitudinal grooves 2 which divide the spiral thread into a plurality of teeth 3 which are arranged in longitudinally extending rows. The nut 4 is formed with a recess 5 which has a portion in communication with the bore of the nut. A small cylindrical body 6 is placed in said recess, said body having teeth thereon which mesh with the teeth 3 on the bolt so that the member 6 must rotate with the bolt. One portion of the recess is provided with teeth 7, which when the member 6 is rotated in one direction, will engage with the teeth thereon and thus prevent further rotation of said member. The teeth are so arranged, however, that the member can be rotated freely in the opposite direction. The member is held in the recess by a cover plate 8 which may be held in position by any suitable means. While the drawing shows but a single recess and member 6 I prefer to use two of these recesses and two members, the recesses being arranged diametrically opposite each other.

From the foregoing it will be seen that when the nut is being rotated in one direction upon the bolt the member 6 will simply revolve freely around the bolt through the intermeshing teeth but when the nut is started to be turned in the opposite direction the teeth on member 6 will engage the teeth 7 on the walls of the recess and thus further movement of the member 6 will be prevented and this member will then lock the nut on the bolt. Thus the nut can be screwed home without interference on the part of the locking member and said member will prevent the nut from becoming loose on the bolt.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lock nut of the class described comprising a bolt having its threads divided into longitudinal rows of teeth, a nut having a recess therein which communicates with the bore of the nut, a toothed member in the recess, the teeth of which engage the teeth on the bolt, means for preventing the member from turning in one direction, such means consisting of teeth on a portion of the wall of the recess for engaging the teeth on the member.

In testimony whereof I affix my signature.

ROGER I. CLAPP.